Nov. 19, 1940. R. H. MANSON 2,222,438
CONDUIT FITTING
Filed Aug. 23, 1938
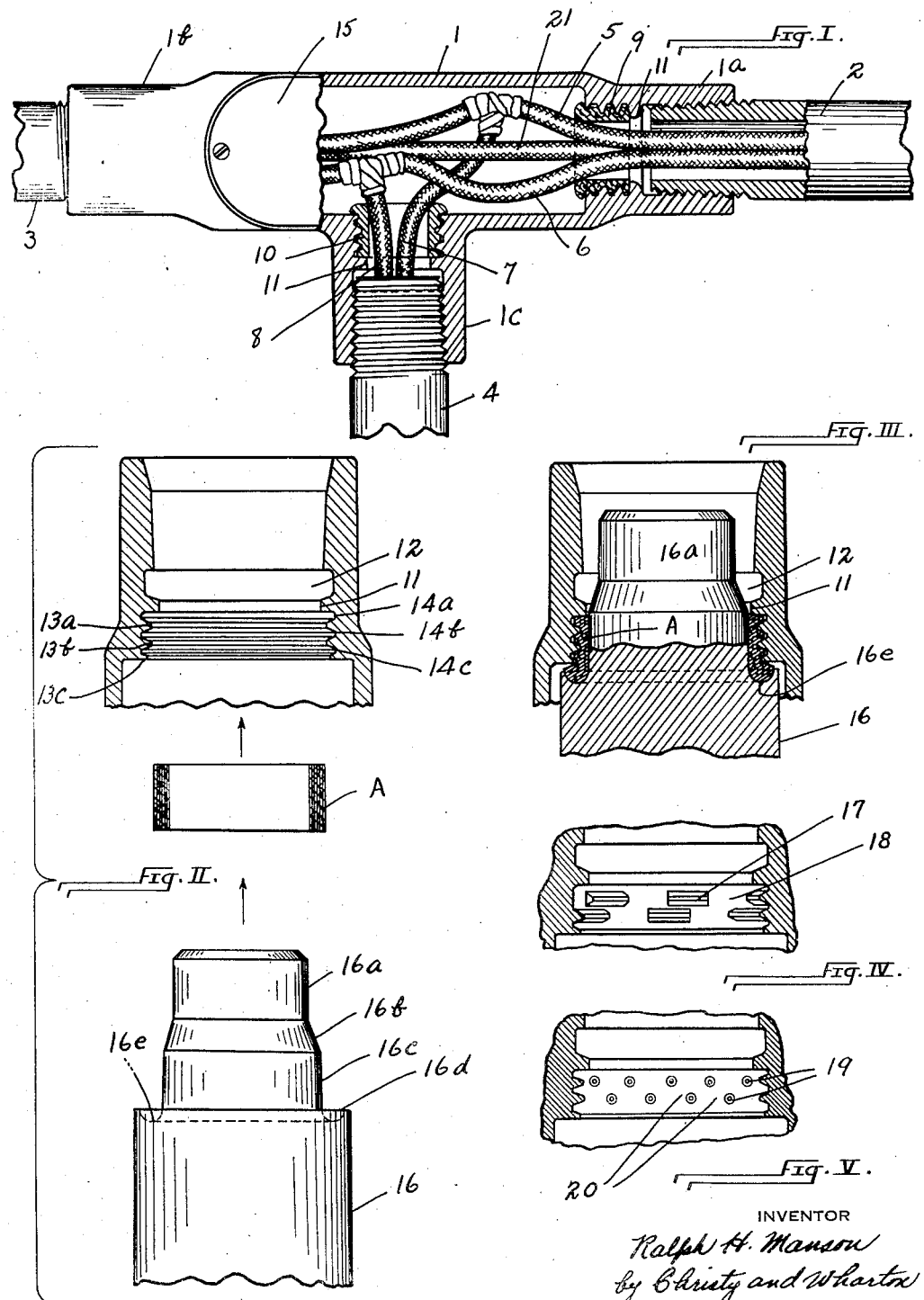
INVENTOR
Ralph H. Manson
by Christy and Wharton
attorneys Patented Nov. 19, 1940

2,222,438

UNITED STATES PATENT OFFICE 2,222,438

CONDUIT FITTING

Ralph H. Manson, Beechview, Pa., assignor to National Electric Products Corporation, a corporation of Delaware Application August 23, 1938, Serial No. 226,268

7 Claims. (Cl. 174—65)

This invention relates to a bushed fitting arranged to provide electrical insulation in the region in which electrical conductors issue from a conduit.

In a region in which electrical conductors issue from a conduit into a fitting, and are deflected from the line in which they lie in the conduit, there is danger that the insulation of the conductors may be worn through by long continued rubbing caused, for example, by vibration in a structure in which the conductor-housing system is included. A similar effect is encountered in regions in which conductors enter a conduit from a fitting included in a conductor-housing conduit system. Even when "pull-boxes," and the like conduit fittings, are so arranged that the entry and exit openings of the fitting are in line with each other, the limited space within a fitting tends to force the conductors against the walls of the fitting adjacent the entry and exit openings, and this crowding tendency is greater when the structural arrangement is such that the conductors are caused to assume an abrupt angle in passing through the fitting. The provision of insulation, additional to that carried by the conductors themselves, in such regions of a conduit system is therefore a matter deserving serious consideration.

In regionally insulating fittings of any sort, serious difficulties present themselves. The insulating material used for the purpose must be in measure tough and wear-resistant, and must be so mounted that it is capable of resisting dislodgement when conductors are fished through the conduit assembly. For reasons of economy, and because of the general advantages resultant from structural unity, it is desirable that the insulation be provided without utilizing in the assembly an additional element purposed solely for mounting and applying the insulation. It is also desirable that the insulation be provided by a single uninterrupted body so proportioned in the assembly, and so mounted, that it does not to any extent constrict the open ends of the conduit channels. It is a matter of primary importance, in good electrical practice, that an electrical conduit system have throughout its extent good grounded continuity, and it is therefore important that the insulation be so placed in the assembly that it does not interfere with full electrical contact between the fitting and the terminal region of a conduit engaged with it.

These requirements I have met by my discovery that a bushing of a particular suitable material may be mounted in a conduit fitting in a position, and in a manner, to maintain it firmly in place against dislodging forces resulting from the fishing of wires, or resulting from shocks or jars to which the assembly may be subjected in its normal usage, and that when mounted, it complies with the above-noted requirements. This I am able to do in cast fittings, without machining the fitting in preparation for the engagement of the bushing, and without the use of any added clamping element.

In the accompanying drawing Fig. I is a view partly in elevation and partly in longitudinal sections, showing a conduit fitting and the proximal regions of the conduit lengths connected with it, with an insulating bushing mounted in fixed position in the fitting; and illustrating the relative position of the assembly elements by which the bushing is rendered fully effective for its purpose without lessening the area of direct grounding contact between the conduit and the fitting; Fig. II is an exploded view, partly in elevation and partly in longitudinal section, showing in fragmentary manner one of those portions of a fitting into which a bushing is to be inserted and fixed; and also showing an insulating bushing, and the working portion of a tool, for anchoring the bushing in the fitting; Fig. III is a longitudinal sectional detail of that region of a fitting in which the insulating bushing is fixed, illustrating the operation of engaging the bushing in the fitting; Fig. IV is a fragmentary longitudinal sectional view showing a modification; and Fig. V is a similar view illustrating another modification in the bushing-engaging means of the fitting.

In the drawing, reference numeral 1 designates a T-fitting for conduits, having threaded into the hubs 1a, 1b, and 1c thereof conduit lengths 2, 3, and 4. As such T-fitting, which of itself is fundamentally of well known sort, is shown in Fig. I of the drawings, insulated conductors 5 and 6 pass through it, and have spliced thereto branch conductors 7 and 8. The T-fitting is equipped with insulating bushings, one being shown in each of the hubs at which the conduit lengths 2 and 4 are secured to the fitting. As shown in Fig. I, these bushings 9 and 10 are placed at the regions where the tubular, conduit-receiving portions, or hubs, of the fitting open into the interior of the main body portion of the fitting. The insulated conductors tend to bear against the interior surface of the fitting in these regions, and it is therefore in these regions that the presence of additional insulation is of particular importance.

I have discovered that fiber tubing, of the hard red variety, sometimes called "vulcanized" fiber, a well known and widely distributed material of commerce, is ideal for use as bushings in conduit fittings. This fiber tubing I cut to a suitable length for use as bushings, and expand the bushings into interlocked engagement in the tubular hub portions of fittings, provided with means for engaging the bushings. As it is normally received from the factory, the fiber tubing is in a condition suitable for use, since it then has a normal moisture content of about 6% its total weight and possesses a limited deformability due to its content of moisture. I have determined that fiber bushings of this sort, containing as little as 4% their weight of moisture may successfully be engaged in fittings as I prepare them to receive the bushings; and I have successfully used bushings containing as much as 8% their weight of moisture. If the moisture content of the fiber bushings substantially exceeds 8% their total weight, subsequent shrinkage tends to loosen them in their engagement with the fitting. It is well known that red fiber, commercially available either in the form of tubing, or in the form of boards, or plates, has good electrical insulating qualities. It is also tough, and wear-resistant, and may be so formed that it does not present sharp edges to the insulation or conductors.

Figs. II and III of the drawing show the manner in which a bushing is inserted into and locked in position in a fitting. First to consider the fitting structure in a region in which a bushing is to be fixed, it will be seen that the bore of the tubular conduit-receiving portion has therein a shoulder 11, which lies rearwardly of a diametrically extended region 12 in which a conduit terminal in assembly lies. Inwardly of the shoulder 11 there is a region provided with a plurality of serrations 13a, 13b, and 13c which in accordance with the showing of Figs. II and III are annular projections into the interior of the fitting hub, and form annular depressions 14a, 14b, and 14c in the bounding wall of the hub bore. That serration 13a, which lies proximal the conduit-receiving end of the hub, has the greatest radial projection into the interior of the hub bore, while the serration 13c, which lies proximal the interior of a fitting body, has the least radial projection into the hub of the fitting. The intermediate serration 13b projects radially a greater distance than the serration 13c, and its radial projection may be equal to, or less than, that of the serration 13a.

The reason for variation in the radial projection of the serrations will readily be understood when it is explained that I insert the fiber insulating bushing by expansion effected by axial pressure within the bushing, and accompanied desirably but not necessarily by a spinning effect produced by rotating the tool used to effect the expansion. The relative arrangement of the annular ribs or serrations is also determined by the fact that the bushing, designated in Figs. II and III of the drawing by reference numeral A, is inserted from the interior of the main body of the fitting. Access to the interior of the main body of the fitting is obtainable merely by removing the cover 15 of the fitting, and introducing the working head 16 of the expansion tool.

By reference to Figs. II and III of the drawing, it will be seen that the working head of the expansion tool comprises forward portion 16a of least diameter, a tapered portion 16b and a portion 16c of greater diameter to which the tapered portion leads. At the base of the larger portion or region 16c, there is a shoulder 16d containing an annular groove 16e, which closely surrounds the base of portion 16c and which is smoothly curved in a plane taken axially of the tool head. It is desirable that the greater diameter region 16c of the tool head be formed with some slight degree of draft, such as an increase of diameter of 0.005" for each ½" of longitudinal distance rearwardly toward the shoulder 16d. Also it is desirable that this portion, or region, of the tool head should bear a relation to the internal diameter of the conduit connected with the fitting hub. Thus, I have found it desirable that the least diameter of the extended portion, or region, 16c of the tool head be slightly greater than the internal diameter of the conduit, for example greater to the extent of 0.005". Since the internal diameter of the bushing then slightly exceeds the internal diameter of the conduit, it does not in any degree present constriction to conductors in the conduit and fitting.

To insert and lock the bushing in mounted position, a bushing is placed either in the serrated region of the fitting hub, or around the more constricted portion 16a of the tool head, and the bushing and tool being brought into the serrated bore of the hub, longitudinal movement of the tool brings the bushing firmly against the shoulder 11 at the outer end of such region, and then causes the tapered portion 16b of the tool to pass along the length of the bushing, expanding the bushing in its progress. I have found that the taper of this expansion portion, or region, of the tool head may be substantial. For example, this portion 16b is shown as having a taper of about 0.001" for each 0.005" longitudinally of the portion. The expanding effect, due to longitudinal progress of this tapered portion of the tool head, forces the bushing radially and bodily outward so that the serrations indent the wall of the bushing, and the material of the bushing flows downward, i. e. radially outward, along the walls of the serrations. The movement of the tool, tending longitudinally to compress the bushing between the shoulder 11 and the shoulder 16d in which the groove 16e lies, also forms the edge of the bushing against the shoulder 16d of the fitting lying at the outer terminal of the serrated region of the hub. Because of the curved section of the groove 16e, the edge of the bushing is smoothly curved as formed, so that it does not present any sharp edge to the insulation of the conductors lying in the fitting, and in a conduit length attached to the hub.

There are certain relationships which must be followed in successfully fixing the insulating bushing in the hub of a fitting in this manner. Thus it is a matter of necessity that the indentations into which the bushing is pressed be so deep that the shrinkage of the bushing, due to decrease in its content of moisture, does not destroy the fixed engagement of the bushing. Also the distance through which the bushing wall is expanded must not be so great that the bushing is cracked by the operation. In line with the above essential relationships, I have found that firm engagement may be obtained, and injury to the bushing avoided in substantially every instance, by following a preferred relative dimensioning of the bushing wall and regulation of the expansion to which the bushing is subjected with respect to the diameter of the hub bore in which the bushing is fixed, and the depth of the indentations into which the material of the bushing is forced.

It is, of course, necessary that the external diameter of the bushing be sufficiently less than the minimum diameter of the bore at the highest point at which the bushing is inserted to permit the bushing initially to be placed in position. Desirably, the initial clearance is increased 0.005" with each increase of ¼" in the minimum diameter of the fitting bore, and desirably, the wall thickness of the bushing is increased 0.010" for each increase of ¼" in the minimum bore diameter of the fitting. To illustrate, with a bore diameter of ½" I have found it most desirable to use a fiber bushing having a wall thickness of .094" and to provide .032" clearance between the outer surface of the bushing and the most restricted point in the bore of the fitting hub. An expansion equal to the wall thickness of the bushing, that is an expansion of .094", takes up the clearance and regionally forces the material of the bushing wall further outward to the extent of .062". Following the same ratio in fixing a bushing within a bore 2" in diameter, the optimum wall thickness of the bushing will be .144", the clearance provided will be .057" and the expansion to which the bushing is subjected will be .144".

I have discovered that it is a consideration of importance that the indentations in the bore of the fitting hub be of such depth that the expansion of the bushing does not cause the bushing material forced into them to flow the entire distance to the base of the indentations. This is for the reason that if the indentations in the bore wall be wholly filled, the expanding effect tends to disrupt the bushing, while if there be a residual clearance at the bottom of the indentations, the disruptive effect is greatly decreased. Taking for example the ½" size mentioned above, and referring to Fig. II of the drawing, the distance between a line joining the apices of the serrations 13a and 13b, and the base of the depression 14b, which lies between them, should be greater than .062 of an inch.

The pressure required fully to expand the bushings, and particularly those of the larger sizes, into anchored position may be greatly reduced by making the serrations discontinuous circumferentially of the bore in which the bushing is fixed. Thus, in the modified arrangement shown in Fig. IV of the drawing, the serrations are in the form of circumferentially elongate, but separated, teeth 17, which are slightly staggered in their circumferential position. In this modification it will be apparent that, as the expansion tool is forced longitudinally of the bushing, longitudinal flow of the bushing substance is minimized, to the benefit of facilitated radial flow of the bushing substance. In this modification the intervals 18 between teeth 17, are none-the-less desirably of such depth with respect to the bushing expansion, or conversely the bushing is desirably expanded such radial distance with respect to the depth of these intervals, that the substance of the bushing is not forced completely to the bottom of the intervals.

The modification shown in Fig. V of the drawing shows the wall of the hub bore provided with conical bosses, or teats, 19 which project radially in the bore in individually isolated position, leaving the distance from their apices to their bases as an interrupted space 20 into which a bushing may radially be expanded. With this modification in the hub of the fitting, the bushing is fixed in position by expanding it radially against the bosses or teats 19 a distance greater than will be nullified by shrinkage of the bushing, as it loses moisture, and less than would force it into contact with the hub wall lying between the bosses.

It is desirable, though not necessary, that the bushings be coated internally and externally with a wax, or other suitable emollient, as such coating lubricates the tool head, and tends to facilitate expanding deformation of the bushing on, and along, the walls of the engaging bodies in the bore of the fitting hub.

The means for locking a bushing in the bore of a fitting hub may thus take the form of what may be considered indentations in the normal bore surface, or may take the form of what may be considered projections from the normal wall surface. In either case clinched engagement of the bushing is facilitated by so forming the surface irregularities that sharp edges, or points, are presented to the bushing surface, to assist the flow of the bushing material. Although sharply contoured bodies are presented to the bushing, it is a valuable incident of my assembly, and my manner of making it, that the fitting may be a cast body, and the bushing clinched in the bores of its hubs, without recourse to a preparatory machining operation. That is, sufficiently sharp clinching bodies, or areas, are provided by casting, in view of the severe deformation which I have discovered I can effect in the material of the bushing.

In connection with the radial expansion of the bushing, it will be observed that, as above outlined, I provide increased wall thickness in compensation for an increased radial expansion factor. In view of the discovered high order of deformability possessed by the fiber, I am thus able to insert bushings of relatively great diameter, such as 4" bushings, in satisfactory clinched engagement, by providing an adequate wall thickness, and effecting adequate expansion of the bushing. To express the relation of the wall thickness of the bushing to its diameter in a general way, I may say that an optimum relationship is had when the wall thickness of the bushing is from about one-eighth to one-tenth the minimum diameter of the bore in which it is clinched. In clinching the bushing in position, the diametric expansion of the bushing preferably approximates the wall thickness of the bushing.

If we take as exemplary a 1" diameter bore formed as in Fig. II of the drawing, with the other dimensions given above, namely a wall thickness and expansion of 0.114", and a clearance of 0.042", the diametric expansion of the bushing down the walls of the clinching bodies in the bore will be 0.072". At any particular point the actual projection of the bushing material will be half that value, or 0.036". A wall height of one-sixty fourth inch, or 0.0625", of the serrations is thus adequate in order that the bushing material may not extend the entire depth of the intervals between the serrations.

It will be understood that the operation of clinching the bushing in position requires relatively great pressure, and that it is, therefore, surprising that the clinching may be effected in a manner to fix the bushing permanently in position, without generally, or at least in a large proportion of applications, cracking or otherwise severely injuring the bushing. By following the general principles given above, hard red, or "vulcanized," fiber bushings, may be clinched in the bores of the cast fittings with a proportion of successful operations so high that the assembly may be considered clearly to be commercially successful. By following the more specific relations between the bushing and the bore in which it is fixed, failure of bushings in either application or service is reduced to a proportion so small as to be negligible.

It should be emphasized that the bushing fixed in conduit fittings as above described is circularly continuous, and that no additional part is used to lock the bushing in position. The bushing is wear-resistant, is smooth, and presents no sharp edges or corners to the insulation of conductors. The utility of providing bushings of this sort, and in this manner, is illustrated in Fig. I of the drawing, which shows a crowded condition in the fitting in the region where the bore of one of the fitting hubs opens into the interior of the fitting body. As shown, this crowding is caused by the inclusion of a third conductor 21, which at some point in the system may, if desired, be used as a neutral conductor.

Fig. I of the drawing also illustrates that, as positioned, the insulating bushings do not in any measure obstruct grounding contact between the conduit terminals and the walls of the fitting hubs. While threaded connection between a fitting and the conduits with which it is associated is shown in the drawing, it is to be understood that other forms of connection, sobeit they provide good grounding contact, may equivalently be used. In making any such connection, the bushing in its installed position leaves wholly free that region of the hub bore in which mechanical and electrical connection is to be made.

I claim as my invention:

1. In a conduit fitting assembly the combination of a hollow fitting body and a hollow hub having its bore in communication with the interior of the said body, the said bore having an outward conduit-engaging region and an inward bushing-engaging region, a plurality of individually isolated bushing-engaging bodies projectant radially inward in the said last-named region of the hub bore, and a radially expanded annular fiber bushing anchored in the said region of the bore by radial penetration and protrusion by and around the said inwardly-projectant bushing-engaging bodies.

2. A conduit fitting assembly in accordance with claim 1 in which that edge of the said bushing which lies toward the interior of the hollow fitting body is smoothly tapered into mergence with the interior surface of the said fitting body.

3. In a conduit fitting assembly the combination of a hollow hub having its bore in communication with the interior of the said body, the said bore having an outward conduit-engaging region and an inward bushing-engaging region, a plurality of individually isolated bushing-engaging bodies projectant radially inward in the said last-named region of the hub bore, and a radially expanded circularly continuous annular fiber bushing anchored in the said region of the bore by radial penetration and protrusion by and around the said inwardly-projectant bushing-engaging bodies.

4. In a conduit fitting assembly the combination of a hollow fitting body and a hollow hub having its bore in communication with the interior of the said body, the said hub bore having therein a shoulder dividing the bore into an outward conduit-engaging region and an inward bushing-engaging region, a plurality of individually isolated bushing-engaging bodies projectant radially inward in the said last-named region of the hub bore, and a radially expanded annular fiber bushing in abutment with the said shoulder and anchored in the said region of the bore by radial penetration and protrusion by and around the said inwardly-projectant bushing-engaging bodies.

5. A conduit fitting assembly in accordance with claim 4 in which that edge of the said bushing which lies toward the interior of the hollow fitting body is smoothly tapered into mergence with the interior surface of the said fitting body.

6. In a conduit fitting assembly the combination of a hollow fitting body and a hollow hub having its bore in communication with the interior of the said body, the said bore having an outward conduit-engaging region and an inward bushing-engaging region, bushing-engaging structure projectant radially inward in the said last-named region of the hub bore, and a radially expanded annular fiber bushing anchored in the said bore region by radial penetration and protrusion by and around the said bushing-engaging structure.

7. In a conduit fitting assembly the combination of a hollow fitting body and a hollow hub having its bore in communication with the interior of the said body, the said hub bore having therein a shoulder dividing the bore into an outward conduit-engaging region and an inward bushing-engaging region, bushing-engaging structure projectant radially inward in the said last-named region of the hub bore, and a radially expanded annular fiber bushing in abutment with the said shoulder and anchored in the said bore region by radial penetration and protrusion by and around the said bushing-engaging structure.

RALPH H. MANSON.